United States Patent [19]

Iehisa et al.

[11] Patent Number: 5,059,760

[45] Date of Patent: Oct. 22, 1991

[54] LASER BEAM MACHINING DEVICE

[75] Inventors: Nobuaki Iehisa, Mishima; Etsuo Yamazaki, Hachioji, both of Japan

[73] Assignee: Fanuc Ltd., Minamitsuru, Japan

[21] Appl. No.: 548,988

[22] PCT Filed: Nov. 15, 1989

[86] PCT No.: PCT/JP89/01163

§ 371 Date: Jul. 30, 1990

§ 102(e) Date: Jul. 30, 1990

[87] PCT Pub. No.: WO90/07397

PCT Pub. Date: Jul. 12, 1990

[30] Foreign Application Priority Data

Dec. 29, 1988 [JP] Japan ............................... 63-332535

[51] Int. Cl.[5] ............................................ B23K 26/02

[52] U.S. Cl. .......................... 219/121.83; 219/121.62

[58] Field of Search ........... 219/121.83, 121.6, 121.61, 219/121.62, 121.63, 121.64, 121.67, 121.68, 121.69, 121.7, 121.71, 121.85

[56] References Cited

U.S. PATENT DOCUMENTS 4,719,342 1/1988 Cohn et al. ................ 219/121.62 X
4,730,113 3/1988 Edwards et al. .......... 219/121.62 X
4,937,422 6/1990 Nagamine et al. ......... 215/121.62 X
4,939,336 7/1990 Meyer et al. .................. 219/121.62
4,968,868 11/1990 Aketag ....................... 219/121.62 X

*Primary Examiner*—C. L. Albritton
*Attorney, Agent, or Firm*—Staas & Halsey

[57] ABSTRACT

A laser beam machining device for machining a workpiece by irradiating a laser beam onto a surface of a workpiece is provided, and comprises a power sensor (21) for detecting the level of a reflected laser beam (11) fed back to a laser oscillator due to a reflection thereof by the surface of the workpiece (10), and an abnormality detecting unit for stopping the operation of the laser oscillator and movement of the workpiece (10) and displaying an alarm at a display device (19) when the power level of the reflected laser beam (11) becomes higher than a predetermined value. The power level of the reflected laser beam (11) fed back to the laser oscillator is monitored by the power sensor (21), and when an abnormal reflection occurs, the monitored value becomes higher than the predetermined value and this increase is detected by the abnormality detecting unit, which then stops the operation of the laser oscillator and movement of one of the workpiece (10) and a nozzle, and displays an alarm at the display device (19).

5 Claims, 4 Drawing Sheets

LASER BEAM MACHINING DEVICE

TECHNICAL FIELD

The present invention relates to a laser beam machining device for machining a workpiece by irradiating a laser beam thereto, and more particularly, to a laser beam machining device by which damage to optical components and defects in the machining of a workpiece caused by a reflected laser beam are prevented.

BACKGROUND ART

When carrying out a machining operation with a laser beam machining device, a laser beam is focused at a point on a workpiece by a focusing lens or the like, whereby the temperature of the irradiated portion is raised, and accordingly, machining operations such as drilling and cutting, etc. can be effected by evaporating a portion of a workpiece by a laser beam converged onto a very small spot, and welding can be effected by slightly shifting the focal point to thereby maintain the fused state of the workpiece. Therefore, various machining operations can be effected regardless of hardness of the material of the workpieces.

Metals such as copper and aluminum, etc., however, have a low capacity for the absorption of a laser beam at normal temperatures, and thus more than 80% of the beam is reflected immediately after the irradiation of a laser beam. Nevertheless, once the metals are heated, the absorption capacity thereof is increased, and thus a required machining operation can be effected. A specific example of this phenomenon is shown in FIGS. 4(*a*) and 4(*b*).

FIG. 4(*a*) is a graph showing a change of the capacity for the absorption by a workpiece of a laser beam, wherein a $CO_2$ gas laser beam is used as the laser beam and aluminum is used as the workpiece. In the figure, 40 denotes the characteristic of an incident laser beam irradiated to the workpiece, i.e., a pulse waveform having a width of a period of from a time t0 to a time t2 and a peak value of Pi, and 41 denotes the characteristic of a reflected laser beam. The level of the reflected laser beam rises, together with the incident laser beam, from the time t0 up to a level Pr, but as the absorption capacity of the workpiece increases thereafter, abruptly drops when close to the time t1.

A change of the reflectivity in the above case is shown in FIG. 4(*b*). In the figure, the times t0 to t2 correspond respectively to those designated by the same symbols in FIG. 4(*a*). As illustrated, the reflectivity is close to 1 at the initial stage of the laser beam irradiation, drops approximately to zero at the time t1, and again approaches 1 after the irradiation is ended.

The above-mentioned reflected laser beam is allowed to pass through the focusing lens and bender mirrors, etc., and is fed back to an oscillator through an output mirror, and therefore, if the peak level Pr of the reflected laser beam, shown in FIG. 4(*a*), is high, the optical components can be damaged by an abnormal increase of the laser power in the oscillator.

Furthermore, while the power level of the reflected laser beam is high, i.e. while the reflectivity is high, a required machining operation cannot be satisfactorily effected.

DISCLOSURE OF THE INVENTION

The present invention was created in view of the above circumstances, and an object thereof is to provide a laser beam machining device by which damage to optical components and defects in the machining of a workpiece caused by a reflected laser beam are prevented.

To achieve the above object, the present invention provides a laser beam machining device for machining a workpiece by irradiating a laser beam onto a surface of the workpiece, which comprises a reflected light detecting means for detecting a power level of a reflected laser beam fed back to a laser oscillator due to a reflection of the beam from the surface of the workpiece, and an abnormality detecting means for stopping the operation of the laser oscillator and the movement of the workpiece or a nozzle portion, and displaying an alarm at a display device, when the power level of the reflected laser beam becomes higher than a predetermined value.

The power level of the reflected laser beam fed back to the laser oscillator is monitored by the reflected light detecting means, and when an abnormal reflection occurs, the monitored value becomes higher than the predetermined value, and this increase is detected by the abnormality detecting means, which then stops the operation of the laser oscillator, close the mechanical shutter and the movement of the workpiece and nozzle and displays an alarm at the display device.

BRIEF DESCRIPTION OF THE DRAWINGS

FIG. 4(*b*) is a graph showing a change of reflectivity with time.

BEST MODE OF CARRYING OUT THE INVENTION

Now, embodiments of the present invention will be described with reference to the drawings.

Figure 1:
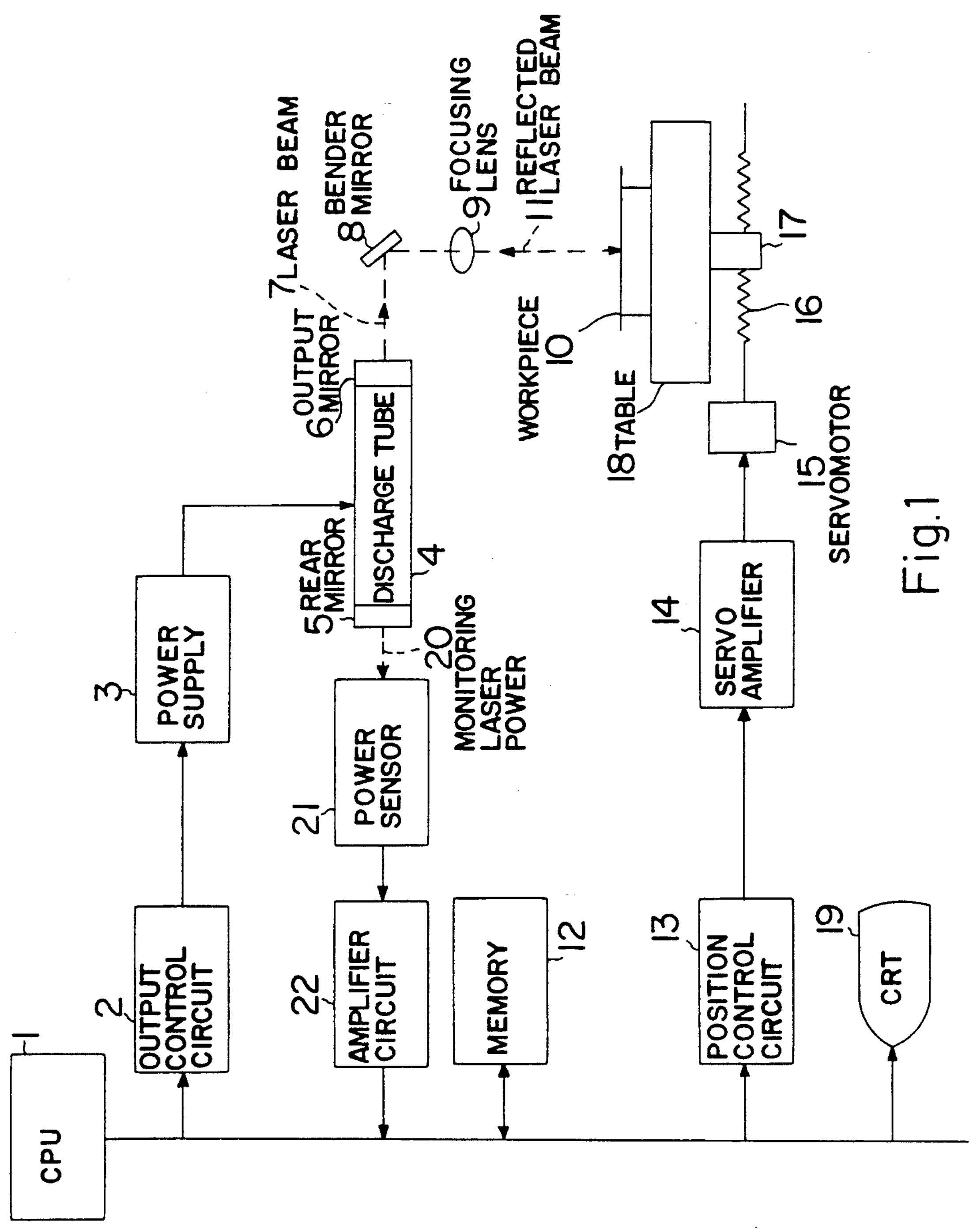
FIG. 1 is a block diagram showing a laser beam machining device according to a first embodiment of the present invention.

FIG. 1 is a block diagram showing a laser beam machining device using a $CO_2$ gas laser oscillator, according to a first embodiment of the invention. In the figure, a processor (CPU) 1 reads out a machining program stored in a memory 12, in accordance with a control program stored in a ROM, not shown, and globally controls the laser beam machining device. An output control circuit 2 converts an output command value supplied from the CPU 1 into a current command value, and has a DA converter incorporated therein for converting a digital value into an analog output. A power supply 3 for the laser device rectifies the commercial power, and outputs a high-frequency voltage in accordance with a command from the output control circuit 2.

A laser gas is circulated within a discharge tube 4, and when a high-frequency voltage is applied from the power supply 3, an electrical discharge is produced and thus the laser gas is pumped. A rear mirror 5 is made of germanium (Ge) and has a reflectivity of 99.5%, and an output mirror 6 is made of zinc selenide (ZnSe) and has a reflectivity of 65%. These mirrors constitute a Fabry-Pérot resonator by which 10.6 μm light emitted from the molecules of the pumped laser gas is amplified and partly output to the outside through the output mirror 6 as a laser beam 7.

The direction of the laser beam 7 is changed by a bender mirror 8, converged into a spot having a diameter of 0.2 mm or less by a focusing lens 9, and irradiated onto a surface of a workpiece 10; 11 denotes a laser beam reflected by the surface of the workpiece 10. The reflected laser beam 11 is returned to the discharge tube 4 through the focusing lens 9, bender mirror 8, and output mirror 6.

The memory 12 stores the machining program and parameters, etc., and is formed by a CMOS backed up by a battery, or the like. A position control circuit 13 decodes a position command value output from the CPU 1, controls the rotation of a servomotor 15 through a servo amplifier 14, and controls the movement of a table 18 through a ball screw 16 and a nut 17 to thereby control the position of the workpiece 10. A CRT or a liquid-crystal display is used as a display device 19.

Numeral 20 denotes a monitoring laser power, output from the rear mirror 5 at a 0.5% transmittance. The output level of the monitoring laser power 20, i.e., a monitored value, corresponds to a value obtained by superposing the reflected laser beam 11 on the laser beam 7, and a fluctuation of the reflected laser beam 11 can be detected by measuring this value.

The monitored value is measured by a power sensor 21 formed by a thermoelectric or photoelectric conversion element of the like. The output of the power sensor 21 is amplified and digitally converted, and then supplied to the CPU 1 for comparison with a threshold value mentioned hereinafter.

Figure 2:
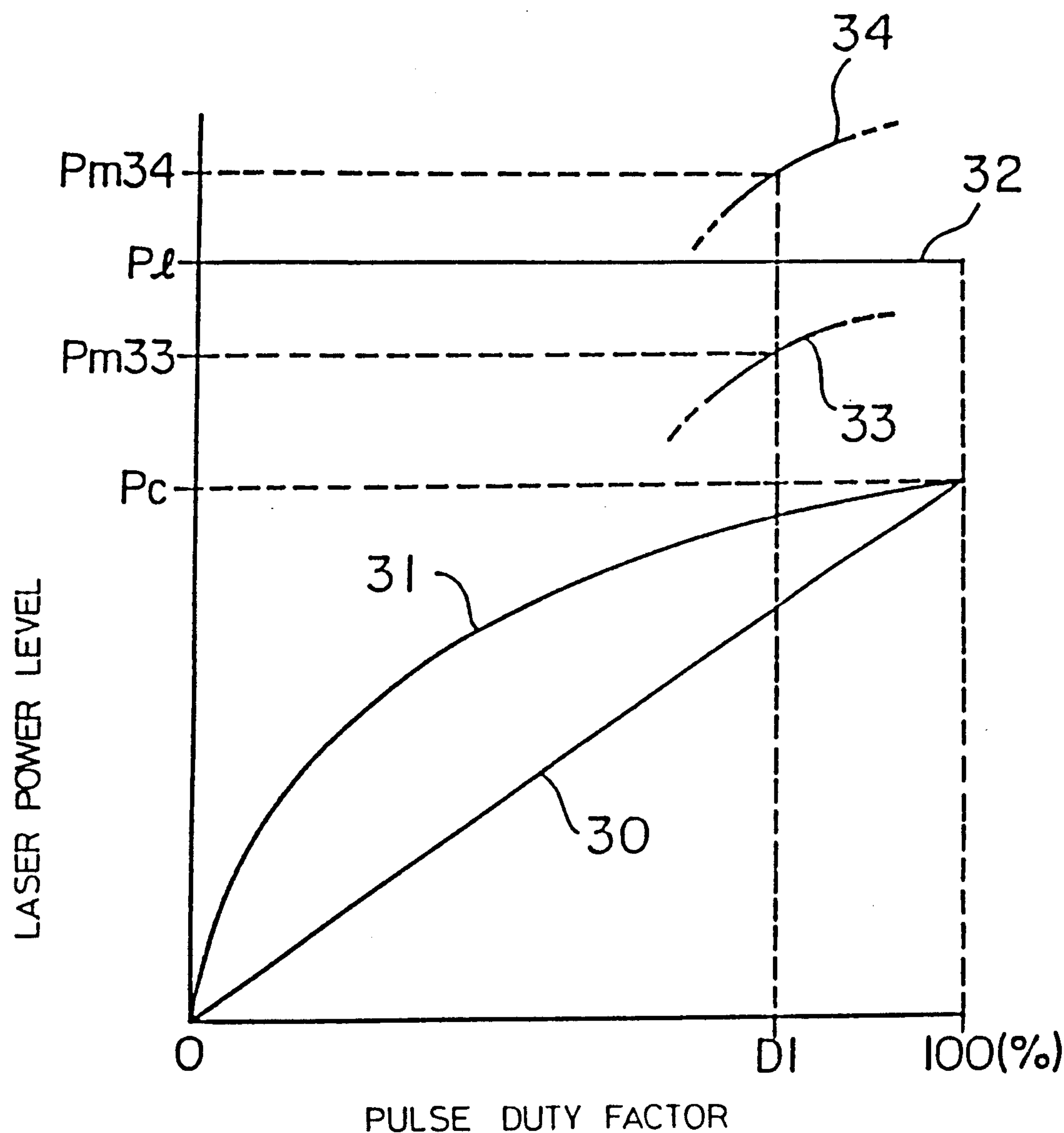
FIG. 2 is a graph showing a laser output of the laser beam machining device according to the first embodiment, and a threshold value.

FIG. 2 is a graph showing a laser output and a threshold value, in which a pulse duty factor is indicated along the axis of the abscissa and a laser power level is indicated along the axis of the ordinate; Pc denotes a basic command value for a continuous oscillation output by the machining program. During a pulse oscillation, pulse duty factor, in addition to the basic command value Pc, is such that a pulse oscillation command 30 proportional to the value of the pulse duty factor is output. In this case, since the pulse enhancement rate is high in a region where the pulse duty factor is small, the laser beam exhibits and output characteristic as indicated at 31. Here, 32 denotes an operating limit for optical components of the oscillator, and is expressed by a breakdown threshold value PΛ which is constant regardless of the value of the pulse duty factor.

In contrast, when a machining operation is actually carried out, the monitored value rises even during a normal machining, due to the reflected laser beam, and accordingly, the monitored value shows a characteristic as indicated at 33. For example, when the laser beam is oscillated with a pulse duty factor D1, the monitored value is Pm33.

Numeral 34 denotes a characteristic monitored when an abnormal reflection of the workpiece occurs, in which the monitored value Pm34 at the pulse duty factor D1 is higher than the breakdown threshold value PΛ. According to this embodiment, such a state is detected by the CPU 1 and the laser oscillation and the movement of the workpiece are stopped, and thus damage to the optical components such as the rear mirror 5 and output mirror 6, etc. is prevented. Simulatneously, an alarm is displayed at the display device 19 to inform the operator that an abnormal state exists.

A second embodiment of the present invention will now be described. This embodiment differs from the first embodiment only in the manner of setting the threshold value, and since the arrangement of the hardware is identical to that shown in FIG. 1, a description thereof is omitted.

Figure 3:
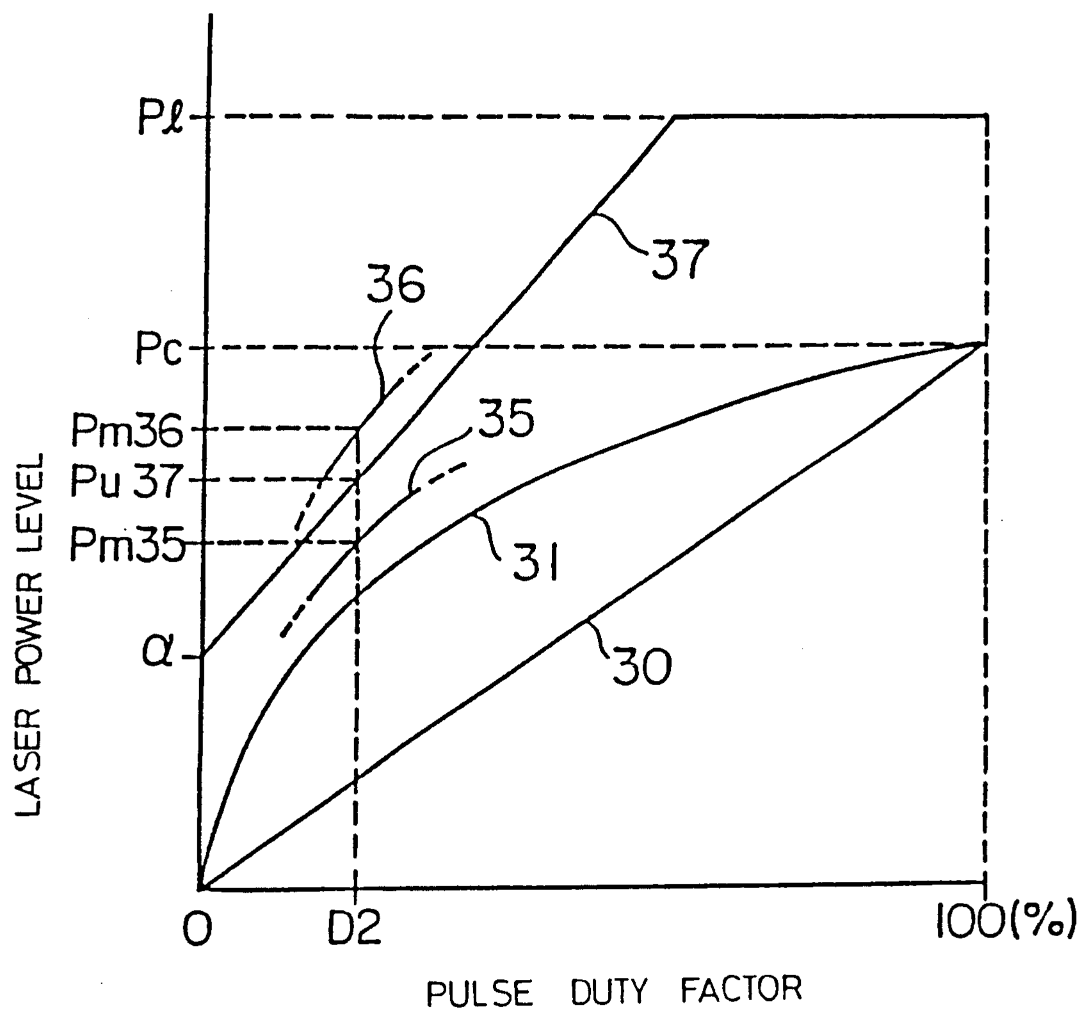
FIG. 3 is a graph showing a laser output of a laser beam machining device according to a second embodiment of the invention, and a threshold value.
Figure 4:
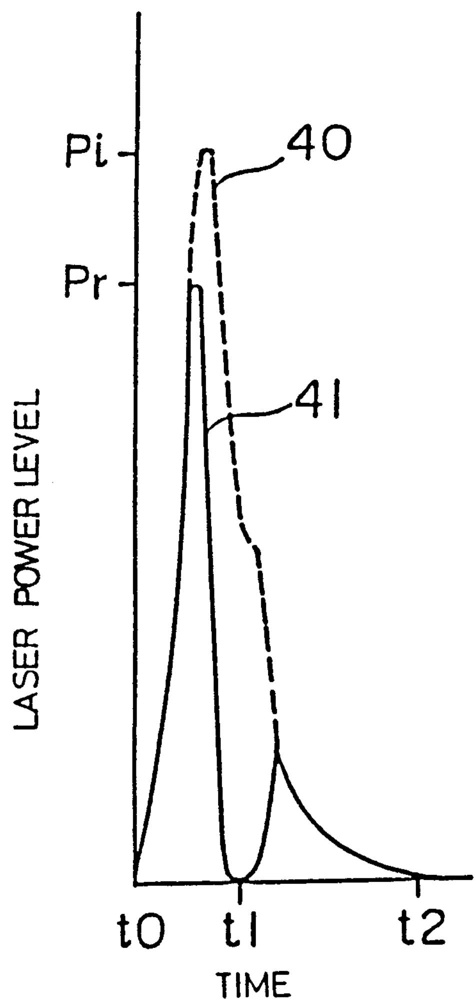
FIG. 4(*a*) is a graph showing a change in the capacity of a workpiece for the absorption of a laser power.
Figure 4:
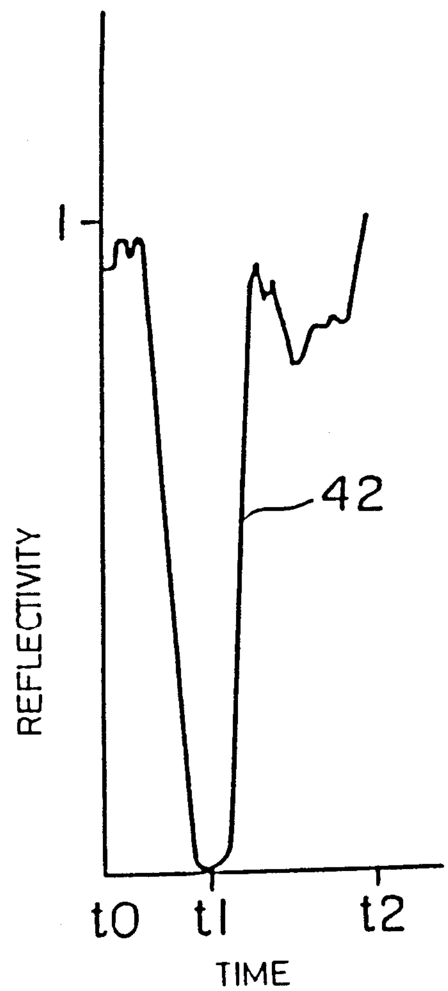

FIG. 3 is a graph showing the laser output according to the embodiment and the threshold value, wherein the pulse duty factor is indicated along the axis of the abscissa and the laser beam level is indicated along the axis of the ordinate. In the figure, symbols corresponding to those in FIG. 2 have the same meaning, and therefore, a description thereof is omitted.

A characteristic monitored in a region where the pulse duty factor is relatively small is indicated at 35; for example, when the laser beam is oscillated with a pulse duty factor D2, the monitored value is Pm35.

Numeral 36 indicates a characteristic monitored when abnormal reflection of the workpiece occurs, in which the monitored value is Pm36. As the value of the pulse duty factor D2 is small, the monitored value Pm36 is lower than the breakdown threshold value PΛ, even when an abnormal reflection occurs, but in practice, the laser beam is not sufficiently absorbed by the workpiece due to the abnormal reflection, and thus a required machining operation cannot be satisfactorily effected. Therefore, according to this embodiment, the detection of an abnormal reflection is based on a threshold value obtained from an allowable laser output characteristic indicated at 37. The allowable laser output characteristic 37 is obtained by calculating maximum output levels estimated to be within the range of a normal machining operation, in accordance with the command values, and is given by the following formulae:

$$Pu = Pc \times Ov \times D + \alpha \quad (\text{when } (Pc \times Ov \times D + \alpha) < Pl)$$

$$Pu = Pl \quad (\text{when } (Pc \times Ov \times D + \alpha) \geqq Pl)$$

where

Pu: allowable maximum laser output;

Ov: output override value;

D: value of pulse duty factor;

α: parameter.

The parameter α is set to different values in accordance with a material and a condition of the surface and the like of the workpiece.

Specifically, the allowable maximum laser output at the pulse duty factor D2 is Pu37. In this embodiment, when the CPU 1 detects that the monitored value Pm36 is higher than the allowable maximum laser output Pu37, the CPU 1 stops the laser oscillation and movement of the workpiece, whereby a defect in the machining of the workpiece is avoided. Simultaneously, an alarm is displayed at the display device, to inform the operator that an abnormal exists.

As described above, according to the present invention, when the level of the reflected laser beam becomes higher than the previously set threshold value, it is determined that an abnormal reflection has occurred, and accordingly, the laser oscillation and movement of the workpiece are automatically stopped. The threshold value used for the detection is set to a breakdown threshold value of the optical components, whereby damage to the optical components is avoided. Further, since an alarm is simultaneously displayed at the display screen, the operator is quickly made aware of the existence of an abnormal state.

Moreover, by setting the threshold value to a maximum output value estimated to be within the range of a normal machining operation, defects in the machining of the workpiece are avoided. Also in this case, an alarm is simultaneously displayed at the display screen, and thus the operator immediately recognizes that an abnormal state exists.

Therefore, according to the present invention, workpiece wastage can be minimized, the machining efficiency improved, and the operating costs lowered.

We claim:

1. A laser beam machining device for machining a workpiece by irradiating a laser beam onto a surface of the workpiece, comprising:

reflected light detecting means for detecting a power level of a reflected laser beam fed back to a laser oscillator due to a reflection of said laser beam by the surface of the workpiece; and abnormality detecting means for stopping an operation of the laser oscillator and a movement of one of the workpiece and a nozzle portion and displaying an alarm at a display device when the power level of the reflected laser beam becomes higher than a predetermined value.

2. A laser beam machining device according to claim 1, wherein said predetermined value is a breakdown threshold value defined by operating limits of optical components constituting the laser oscillator.

3. A laser beam machining device according to claim 1, wherein said predetermined value is a maximum output value estimated to be within a range of a normal machining operation.

4. A laser beam machining device according to claim 1, wherein said maximum output value is given by the following formulae:

$$Pu = Pc \times Ov \times D + \alpha \quad \text{(when } (Pc \times Ov \times D + \alpha) < Pl\text{)}$$

$$Pu = Pl \quad \text{(when } (Pc \times Ov \times D + \alpha) \geqq Pl\text{)}$$

where

Pu: maximum output value;

Pc: command value for continuous oscillation;

PΛ: breakdown threshold value;

Ov: output override value;

D: value of pulse duty factor;

$\alpha$: parameter set in accordance with a material and condition of the surface of the workpiece.

5. A laser beam machining device according to claim 1, wherein said reflected light detecting means detects the power level of the reflected laser beam by means of a monitoring laser beam transmitted thereto through a rear mirror of the laser oscillator.

* * * * *

UNITED STATES PATENT AND TRADEMARK OFFICE
CERTIFICATE OF CORRECTION

PATENT NO. : 5,059,760

DATED : October 22, 1991

INVENTOR(S) : Iehisa et al.

It is certified that error appears in the above-identified patent and that said Letters Patent is hereby corrected as shown below:

Title page, item [56],

"Aketag" should be --Aketagawa--.

Col. 3, line 43, "tion, pulse" should be --tion, a pulse--;
line 51, "PΛ" should be --Pℓ--;
line 64, "PΛ" should be --Pℓ--.

Col. 4, line 24, "PΛ" should be --Pℓ--;
line 40, "P/ )" should be --Pℓ)-;
line 41, "P/ " should be --Pℓ--;
line 42, "P/ " should be --Pℓ--.

Col. 6, line 13, "P/ )" should be --Pℓ)--;
line 14, "P/ " should be --Pℓ--;
line 15, "P/ )" should be --Pℓ)--;
line 20, "PΛ" should be --Pℓ--.

Signed and Sealed this

Thirtieth Day of March, 1993

Attest:

STEPHEN G. KUNIN

*Attesting Officer* *Acting Commissioner of Patents and Trademarks*